United States Patent
Yamada

(10) Patent No.: US 8,825,343 B2
(45) Date of Patent: Sep. 2, 2014

(54) FUEL INJECTION CONTROL DEVICE AND METHOD OF DIESEL ENGINE

(75) Inventor: Satoshi Yamada, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 278 days.

(21) Appl. No.: 13/388,146

(22) PCT Filed: Feb. 2, 2011

(86) PCT No.: PCT/JP2011/052106
§ 371 (c)(1),
(2), (4) Date: Jan. 31, 2012

(87) PCT Pub. No.: WO2011/099405
PCT Pub. Date: Aug. 18, 2011

(65) Prior Publication Data
US 2012/0130622 A1  May 24, 2012

(30) Foreign Application Priority Data
Feb. 12, 2010 (JP) ................................ 2010-028418

(51) Int. Cl.
*F02M 51/00* (2006.01)
*F02D 35/02* (2006.01)
*F02D 41/30* (2006.01)

(52) U.S. Cl.
CPC ............ *F02D 35/024* (2013.01); *F02D 35/028* (2013.01); *F02D 41/30* (2013.01); *F02D 2200/703* (2013.01); *F02D 2200/0618* (2013.01)
USPC ......................................... 701/105; 123/478

(58) Field of Classification Search
CPC ..... F02D 35/024; F02D 35/028; F02D 41/30; F02D 2200/703; F02D 2200/0618
USPC .......... 701/105, 104, 114; 123/295, 305, 478, 123/298, 299
See application file for complete search history.

(56) References Cited

U.S. PATENT DOCUMENTS 6,651,677 B2 * 11/2003 Sukegawa et al. ............ 123/305
6,990,949 B2 *  1/2006 Kataoka et al. ............... 123/299
(Continued)

FOREIGN PATENT DOCUMENTS

| JP | 6-299894 | 10/1994 |
|---|---|---|
| JP | 2001-193527 | 7/2001 |

(Continued)

OTHER PUBLICATIONS

International Search Report issued Mar. 15, 2011 in corresponding International Application No. PCT/JP2011/052106.

(Continued)

*Primary Examiner* — Mahmoud Gimie
(74) *Attorney, Agent, or Firm* — Wenderoth, Lind & Ponack, L.L.P.

(57) ABSTRACT

A fuel injection control device provided with: a standard fuel injection timing setting unit 41 which previously sets a standard fuel injection timing with respect to engine speed and fuel injection quantity; an injection penetration judging unit 45 which judges whether or not the penetration of the fuel atomization in a cylinder is in an increasing condition, by use of at least one out of a detected ambient pressure from an ambient pressure sensor, an estimated cylinder pressure at an injection start timing, and an estimated ignition delay from an injection start timing to a combustion start timing; and a fuel injection timing correction unit 43 which corrects the fuel injection timing toward an advanced timing angle and constrains the penetration of the fuel atomization, in a case where the penetration judging unit judges that the penetration of the fuel atomization is in an increasing condition.

8 Claims, 10 Drawing Sheets

(56) References Cited

U.S. PATENT DOCUMENTS

| | | | | |
|---|---|---|---|---|
| 7,165,527 | B2* | 1/2007 | Okude et al. | 123/299 |
| 2003/0056752 | A1* | 3/2003 | Sukegawa et al. | 123/305 |
| 2003/0111041 | A1* | 6/2003 | Kimura | 123/295 |
| 2003/0217732 | A1* | 11/2003 | Kataoka et al. | 123/276 |
| 2006/0219214 | A1* | 10/2006 | Okude et al. | 123/299 |

FOREIGN PATENT DOCUMENTS

| | | |
|---|---|---|
| JP | 2002-242744 | 8/2002 |
| JP | 2003-286879 | 10/2003 |
| JP | 2010-7584 | 1/2010 |

OTHER PUBLICATIONS

International Preliminary Report on Patentability and Written Opinion of the International Searching Authority issued Sep. 18, 2012 in corresponding International Application No. PCT/JP2011/052106 (with English translation).

Korean Notice of Allowance, with English translation, issued Dec. 12, 2013 in corresponding Korean Patent Application No. 10-2011-7031008.

* cited by examiner

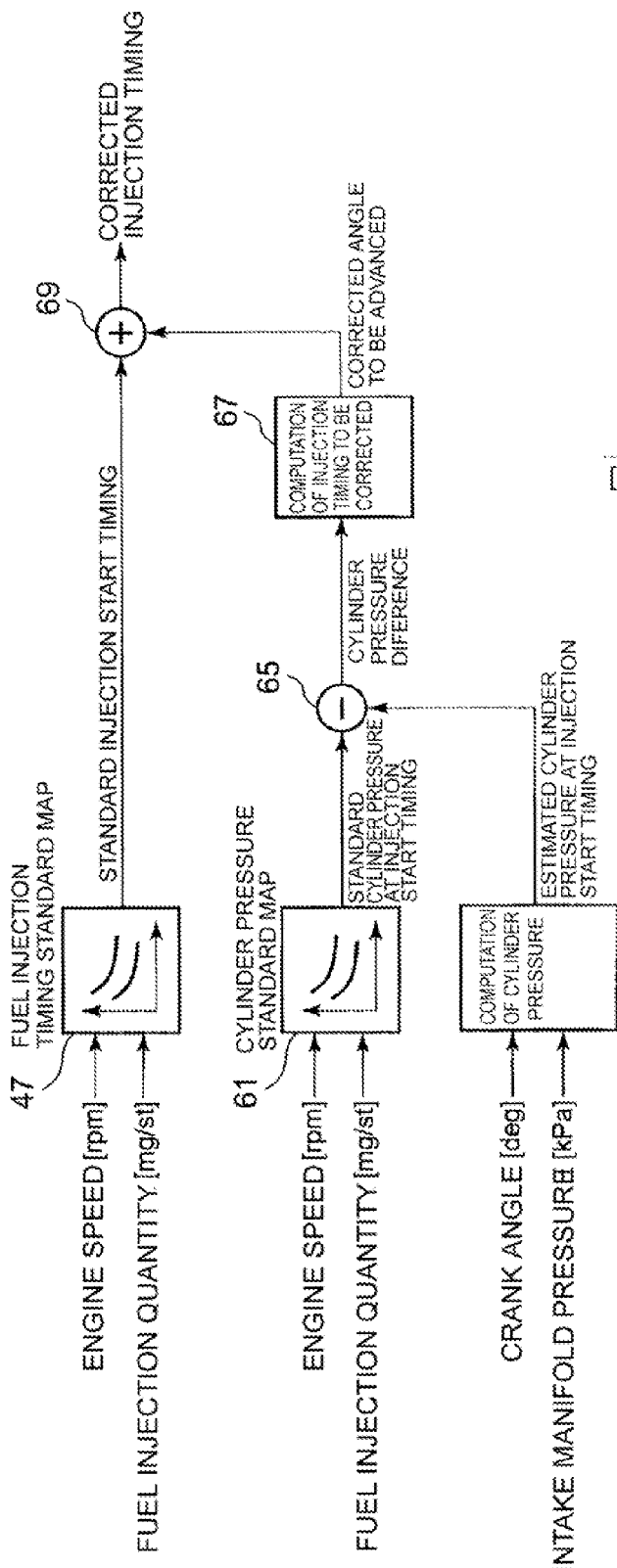
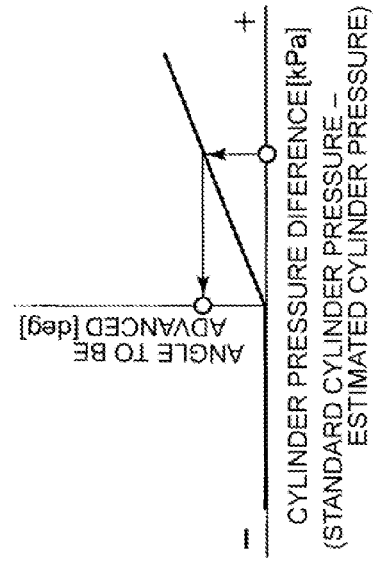
Fig. 4(a)
Fig. 4(b)

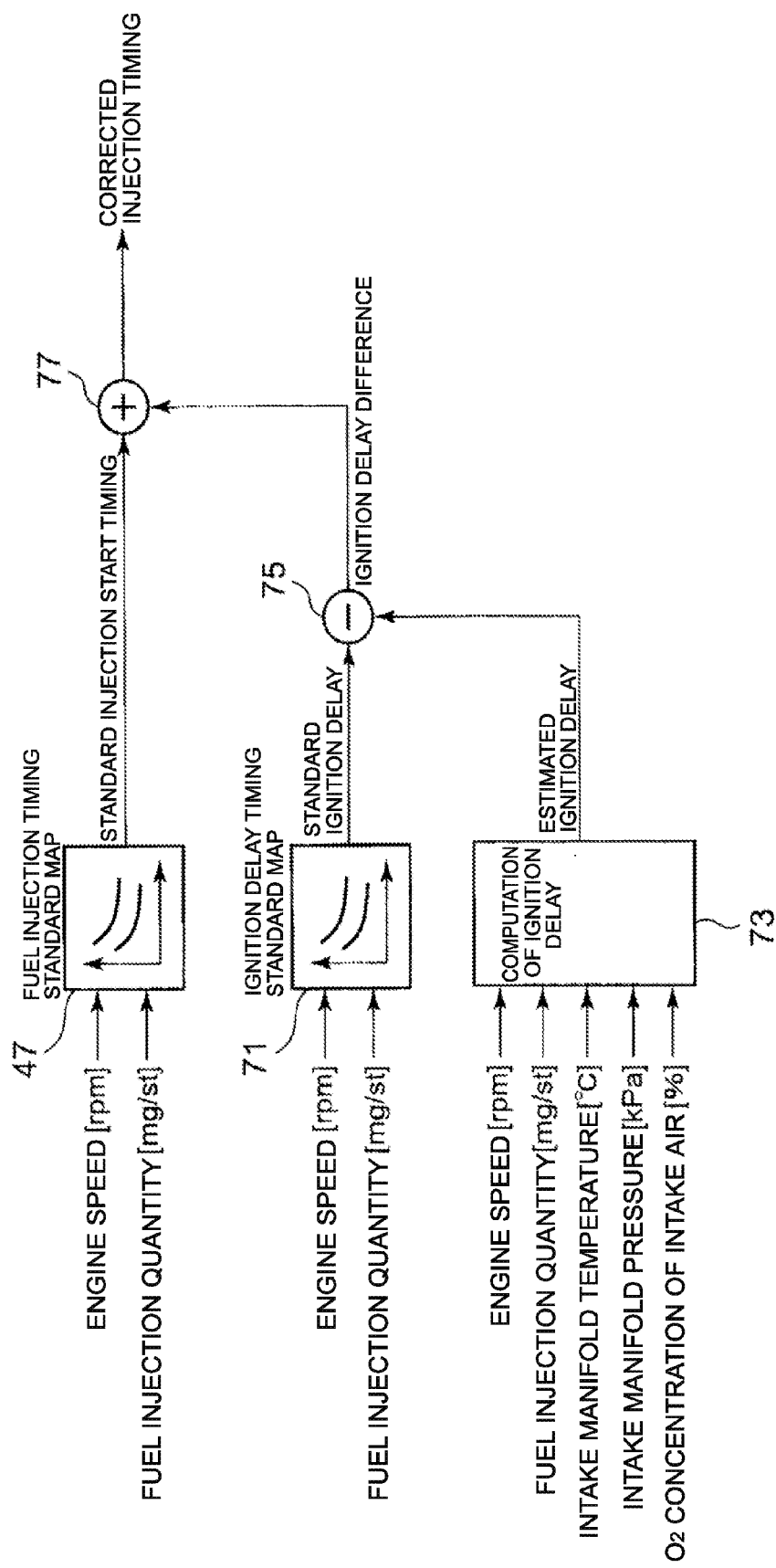

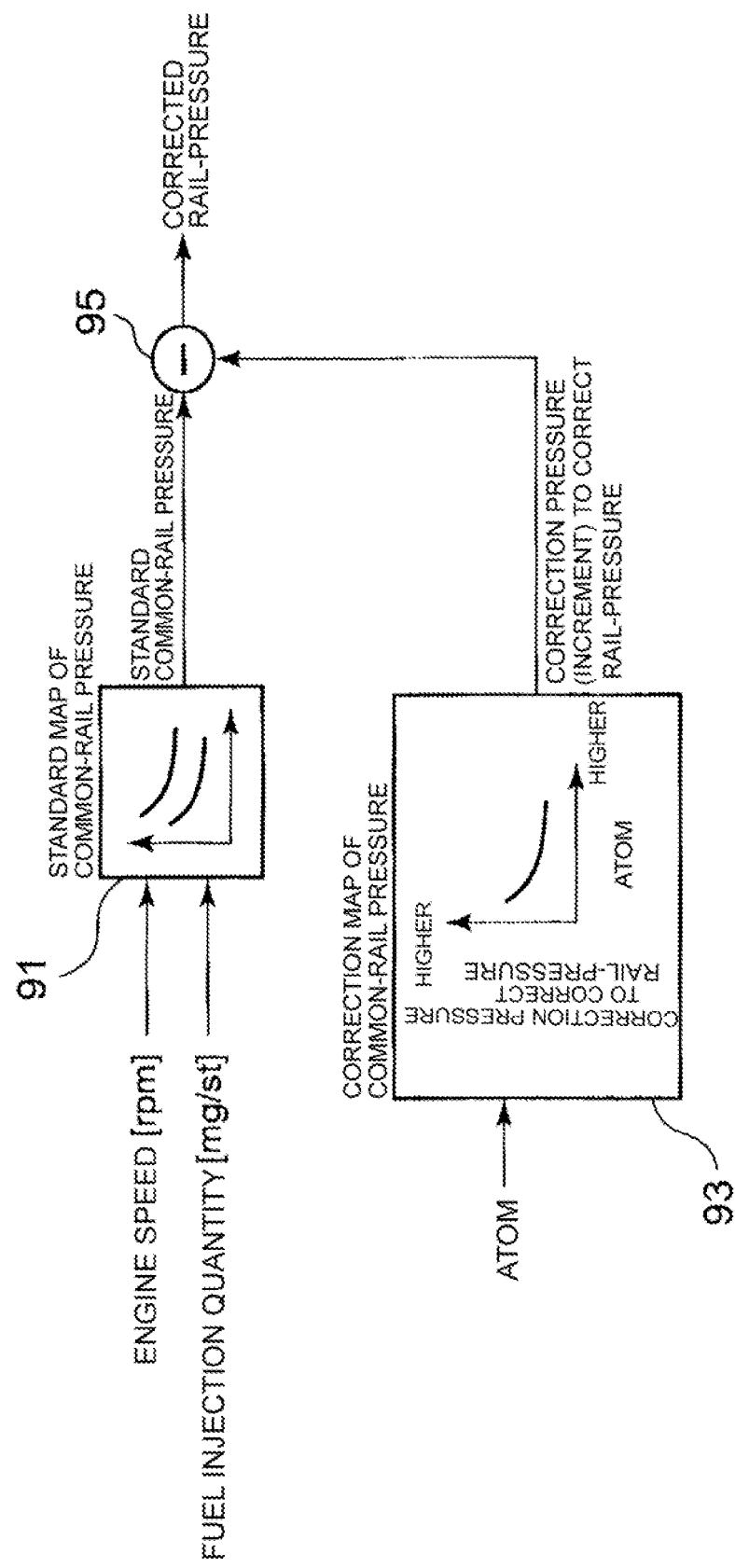

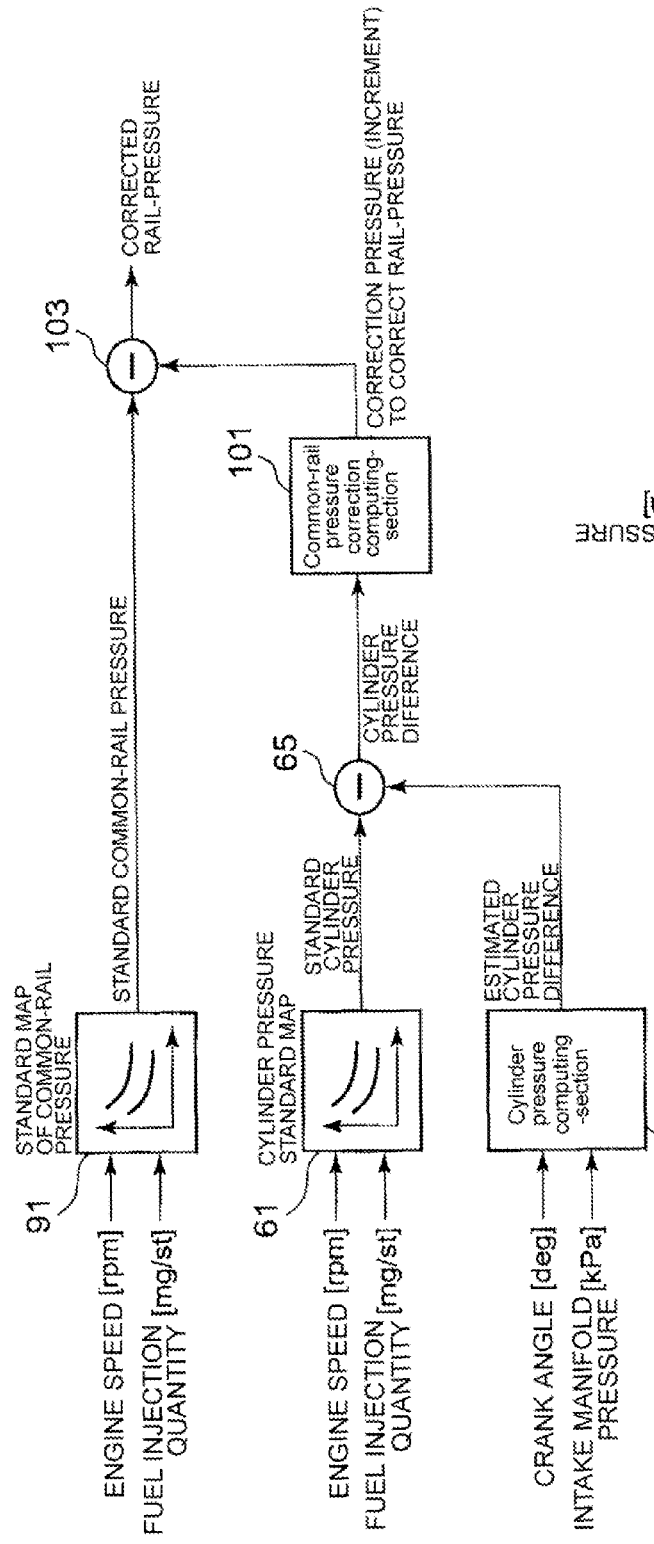
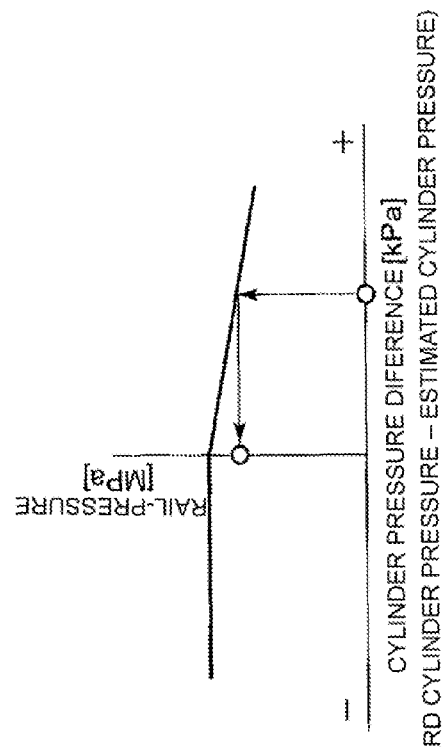
Fig. 8(a)
Fig. 8(b)

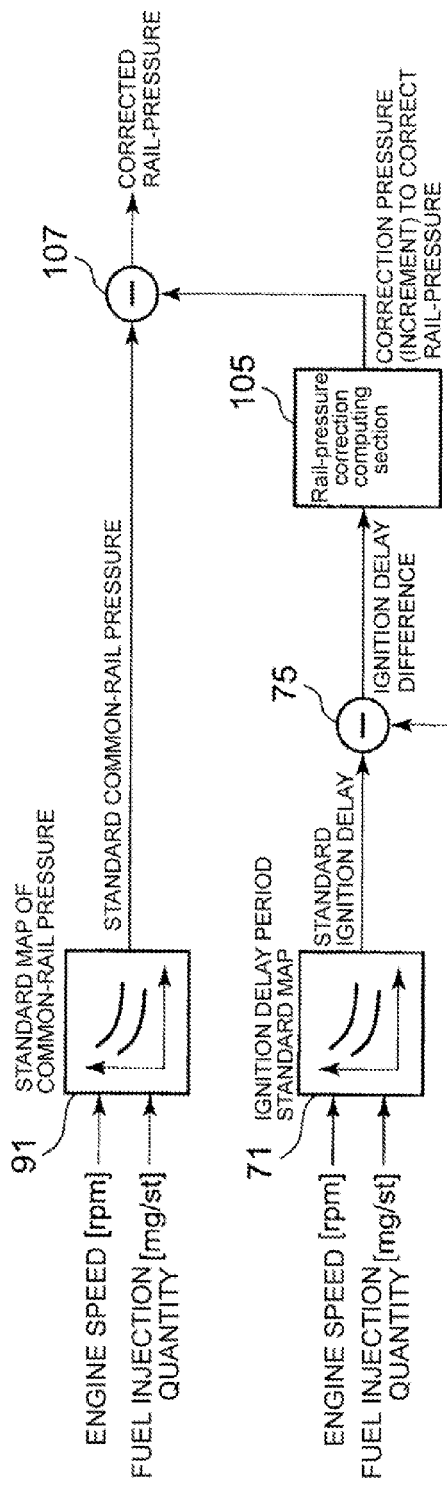
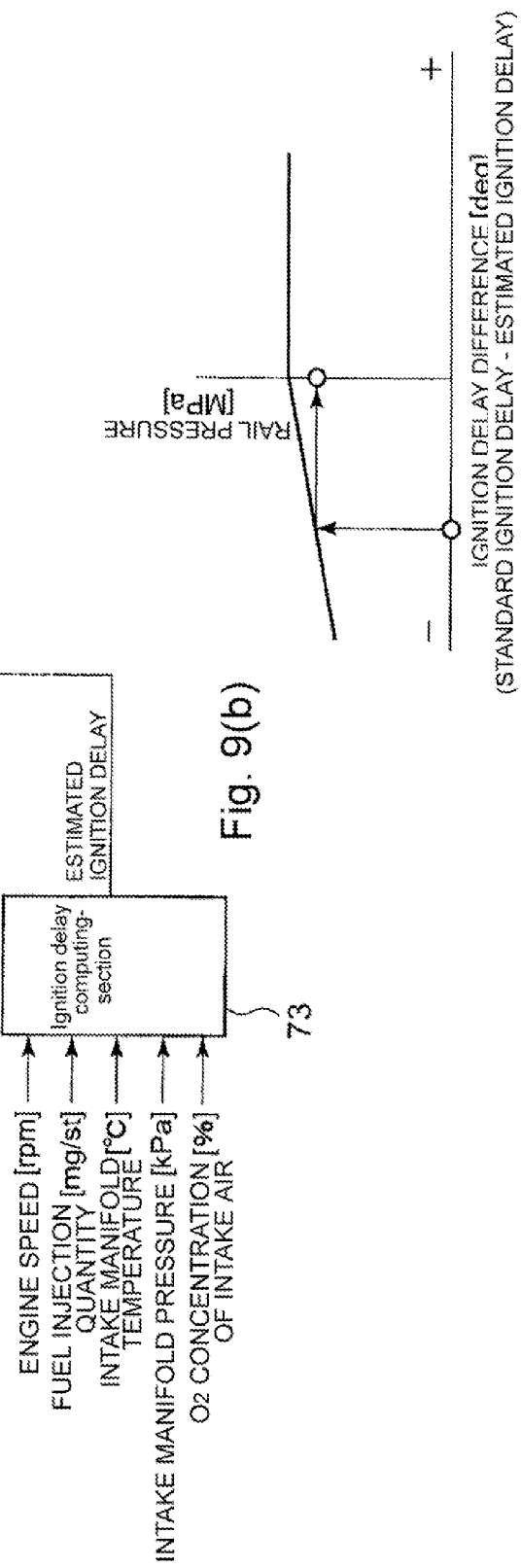
Fig. 9(a)
Fig. 9(b)

FUEL INJECTION CONTROL DEVICE AND METHOD OF DIESEL ENGINE

BACKGROUND OF THE INVENTION

1. Field of the Invention

The present invention relates to a fuel injection control device as well as a fuel injection control method of a diesel engine.

2. Background of the Invention

As an exhaust gas emission control measure for a diesel engine, NOx reduction is essential. As an approach of NOx reduction, the timing retard of the fuel injection timing is often applied so that the NOx reduction is performed by reducing the combustion temperature in the cylinder. The timing retard is often required especially for an engine in which EGR (Exhaust Gas Recirculation) is not performed.

However, when the injection-timing is excessively retarded, the combustion efficiency is deteriorated and soot is easily generated; further, in response to the increase of fuel atomization penetration or combustion flame penetration, the possibility that the soot comes in contact with a cylinder liner is increased. Hereby, the increase of fuel atomization penetration or combustion flame penetration is caused by the reduction of the cylinder pressure. Thus, the quantity of the soot getting into lube-oil increases. And, when the contamination of the soot in the lube-oil is increased, the lubricity properties of the lube-oil are deteriorated. Hence, the risk of the deterioration of the performance such as fuel consumption as well as the risk of occurrence of scuffing (seizure or scratch on cylinder liner surfaces) may increase.

FIG. 11 shows the relationship between the contamination rate of soot in lube-oil and the timing of the fuel injection end (in crank angle after top dead center [ATDC]). As shown in FIG. 11, when the fuel injection end timing is retarded beyond a certain crank angle, the contamination rate of soot in lube-oil abruptly starts increasing; when the fuel injection end timing is further retarded to a certain level, the contamination rate of the soot reaches a peak point. After the fuel injection end timing is retarded beyond the level in response to the peak, the contamination rate of the soot tends to be gradually decreased. The reason of this decrease tendency is that the fuel which stays unburned increases in response to the excessive timing retard, so that the generated soot is decreased.

On the other hand, Patent Reference 1 (JP2002-242744) discloses a conventional-technology, in which the quantity of the generated soot is decreased while the NOx emission of a diesel engine is reduced.

In the technology of Patent Reference 1, the fuel injection duration is divided (i.e. divided and dispersed) into a plurality of injection periods in a range from an early stage of an intake stroke to an early stage of an expansion stroke; the period of the last injection out of the divided injections is located in the neighborhood of the top dead center of a compression stroke. In this way, NOx reduction is aimed at. Further, an additional fuel injection, namely, an after-fuel-injection is performed after all the divided injections described above are completed so that the after-fuel-injection is started around a time point when the fuel diffusion combustion in response to the divided injections is finished. Thus, the reduction of soot can be achieved.

REFERENCES

Patent References

Patent Reference 1: JP2002-242744

SUMMARY OF THE INVENTION

Subjects to be Solved

According to the technology of Patent Reference 1, however, the after-injection of fuel is further performed around a time point when the fuel diffusion combustion by the divided injections is finished, so as to prevent the soot generation. Hence, because of the divided fuel injections, the control of the fuel injection quantity as well as the fuel injection timing becomes complicated. Further, Patent Reference 1 does not disclose the control in consideration of the effect of the change of an ambient operation condition such as ambient pressure or ambient temperature as well as the effect of the increase of the soot contact on the cylinder liner surfaces, the increase of the soot being attributable to the fuel atomization penetration or the combustion flame penetration. Hereby, the increase of fuel atomization penetration or combustion flame penetration is caused by the reduction of the cylinder pressure.

Further, as described above, when the contamination of the soot in the lube-oil is increased, the lubricity properties of the lube-oil are deteriorated. Hence, there has been a problem that the risk of the deterioration of the performance such as fuel consumption as well as the risk of occurrence of scuffing (seizure or scratch on cylinder liner surfaces) may increase. In this regard, it becomes necessary to constrain the quantity of the contamination of the soot in the lube-oil, by setting a retard limit of the fuel injection end timing so that the quantity of the soot generation as well as the quantity of the soot adhesion on the cylinder liner surfaces is constrained. Hereby, however, there has been a problem that the flame penetration in the combustion chamber is extended (e.g. the penetration is increased in a high land) in response to an operation environment such as ambient pressure or ambient temperature, or the ignition delay is prolonged (e.g. the ignition delay especially in a low temperature environment) and the possibility of the soot contact on the cylinder liner surfaces is increased. Thus, there has been a problem that the contamination of the soot in the lube-oil cannot be pertinently constrained.

Further, the fuel atomization penetration or the combustion flame penetration in the combustion chamber is greatly influenced by not only the fuel injection timing limitation but also the fuel injection pressure. Hence, it has been expected to control the fuel injection pressure.

In view of the problems as described above, the present invention aims at providing a fuel injection control device as well as a fuel injection control method of a diesel engine in which the fuel injection timing or the fuel injection pressure is controlled so that the quantity of the soot adhesion on the cylinder liner surfaces is constrained and the quantity of the contamination of the soot in the lube-oil is constrained, even in a case where a fuel atomization penetration or a combustion flame penetration in a combustion chamber is extended in response to the change of an operation environment condition such as ambient pressure or ambient temperature, or even in a case where an ignition delay is prolonged.

Means to Solve the Subjects

In order to solve the above-described problems, a first aspect of the present invention discloses a fuel injection control device of a diesel engine, the device including, but not limited to:

a fuel injection valve which injects a fuel into a combustion chamber; and a fuel injection timing control unit which controls a fuel injection timing of the fuel from the fuel injection valve, wherein the fuel injection control device includes, but not limited to:

a standard fuel injection timing setting unit which previously sets a standard fuel injection timing with respect to engine speed and fuel injection quantity;

a penetration judging unit which judges whether or not the penetration of the fuel atomization in a cylinder is in an increasing condition, by use of at least one of a detected ambient pressure detected by an ambient pressure sensor, an estimated cylinder pressure at an injection start timing, and an estimated ignition delay from an injection start timing to a combustion start timing; and a fuel injection timing correction unit which, by correcting the fuel injection timing toward an advanced timing angle, constrains the penetration of the fuel atomization in a case where the penetration judging unit judges that the penetration of the fuel atomization is in an increasing condition.

According to the first aspect of the present invention, the penetration judging unit judges whether or not the penetration of the fuel atomization reaches the cylinder liner and the chance of the contact of the fuel to the liner increases, by use of at least one of a detected ambient pressure from an ambient pressure sensor, an estimated cylinder pressure at an injection start timing, and an estimated ignition delay from an injection start timing to a combustion start timing.

To be more specific, when the detected value from the ambient pressure sensor decreases, it is judged that the penetration of the fuel atomization increases, as the air density in the cylinder decreases in response to the decrease of the ambient pressure.

Further, the estimated cylinder pressure at the fuel injection start timing is computed. In a case where the computed estimated-cylinder-pressure is lower than a standard cylinder pressure at the fuel injection start timing, it is judged that the penetration of the fuel atomization increases; hereby, the standard cylinder pressure is previously established with respect to the engine speed and the fuel injection quantity.

Further, the estimated ignition-delay from an injection start timing to a combustion start timing is computed. In a case where the computed estimated-ignition-delay is greater than a standard ignition-delay which is previously established with respect to the engine speed and the fuel injection quantity, it is judged that the penetration of the fuel atomization in the cylinder increases. In other words, the greater the estimated-ignition-delay is, the lower the cylinder pressure; and, it is judged that the penetration of the fuel atomization is increased. The reason why the cylinder pressure becomes lower is that, when the estimated-ignition-delay becomes greater, the injection period overlaps with a period where the piston moves in an expansion stroke.

Accordingly, when the penetration judging unit judges that the fuel atomization penetration is increasing, the fuel injection timing correction unit corrects the fuel injection timing toward an advanced side; namely, the fuel injection timing correction unit corrects the fuel injection timing toward a higher cylinder pressure side. In other words, the fuel injection timing is corrected so that the fuel injection end timing is moved toward the peak cylinder pressure side. In this way, the generation of soot can be constrained; the adhesion of soot to the cylinder liner can be reduced; the contamination of soot into the lube-oil can be reduced; and the lubricity properties of the lube-oil can be prevented from being deteriorated. Thus, the deterioration of the performance such as fuel consumption as well as the occurrence of scuffing (seizure or scratch on cylinder liner surfaces) can be prevented.

Further, a second aspect of the present invention discloses a fuel injection control device of a diesel engine, the device including, but not limited to:

a fuel injection valve which injects fuel into a combustion chamber; and a fuel injection pressure control unit which controls a fuel injection pressure of the fuel from the fuel injection valve, wherein the fuel injection control device includes, but not limited to:

a standard fuel injection pressure setting unit which previously sets standard fuel injection pressure with respect to engine speed and fuel injection quantity;

a penetration judging unit which judges whether or not the penetration of the fuel atomization in a cylinder is in an increasing condition, by use of at least one of a detected ambient pressure detected by an ambient pressure sensor, an estimated cylinder pressure at an injection start timing, and an estimated ignition delay from an injection start timing to a combustion start timing; and an fuel injection pressure correction unit which, by correcting the fuel injection pressure toward a reduced side, constrains the penetration of the fuel atomization in a case where the penetration judging unit judges that the penetration of the fuel atomization is in an increasing condition.

According to the above-described second aspect of the present invention, when the penetration judging unit judges that the penetration of the fuel atomization is increasing, the fuel injection pressure correction unit constrains the penetration of the fuel atomization, by correcting a standard injection pressure which is established with respect to the engine speed and the fuel injection quantity toward a reduced pressure side. In this way, the penetration of the fuel atomization is constrained. Accordingly, the adhesion of soot to the cylinder liner can be reduced; the contamination of soot into the lube-oil can be reduced; and the lubricity properties of the lube-oil can be prevented from being deteriorated. Thus, the deterioration of the performance such as fuel consumption as well as the occurrence of scuffing (seizure or scratch on cylinder liner surfaces) can be prevented.

Further, a preferable embodiment of the first aspect or the second aspect is the fuel injection control device of a diesel engine, wherein:

the estimated cylinder pressure at an injection start timing is computed based on the pressure in an intake manifold; and it is judged that the penetration of the fuel atomization in the cylinder is in an increasing condition in a case where the computed estimated-cylinder-pressure is lower than the standard cylinder pressure at an injection start timing according to the standard injection timing.

As described above, by computing and estimating the cylinder pressure at the fuel injection start timing, it is judged whether the fuel atomization penetration is in an increasing condition or a decreasing condition; thus, the judgment hereby can be performed with higher accuracy in comparison with the judgment by use of the atmospheric pressure.

Further, another preferable embodiment of the first aspect or the second aspect is the fuel injection control device of a diesel engine, wherein:

the estimated level for the ignition delay from the injection start timing is computed based on the pressure and temperature inside of the intake manifold, and the oxygen concentration of inhaled gas; and it is judged that the penetration of the fuel atomization in the cylinder is in an increasing condition, in a case where the computed estimated ignition delay is greater than the standard ignition delay at an injection start timing according to the standard injection timing.

As described above, by computing and estimating the ignition delay from the injection start timing to the ignition start timing, it is judged whether the fuel atomization penetration is in an increasing condition or a decreasing condition; thus, the judgment hereby can be performed with higher accuracy in comparison with the judgment by use of the atmospheric pressure.

Further, in a case where the temperature of the intake air changes or in a case where the oxygen concentration of the intake air changes because of the EGR flow rate control, the ignition delay occurs; even in these events, the ignition delay is computed and estimated. Thus, the above-described embodiment can deal with the change of the intake air temperature as well as the change of the EGR flow rate.

Further, a third aspect of the present invention discloses a fuel injection control method of a diesel engine, the engine including, but not limited to:

a fuel injection valve which injects fuel into a combustion chamber; and a fuel injection timing control unit which controls a fuel injection timing of the fuel from the fuel injection valve, wherein the method includes, but not limited to the steps of:

previously setting a standard fuel injection timing with respect to engine speed and fuel injection quantity;

subsequently judging whether or not the penetration of the fuel atomization in a cylinder is in an increasing condition, by use of at least one of a detected ambient pressure detected by an ambient pressure sensor, an estimated cylinder pressure at an injection start timing, and an estimated ignition delay from an injection start timing to a combustion start timing; and correcting the fuel injection timing toward an advanced timing angle and constraining the penetration of the fuel atomization, in a case where it is judged that the penetration of the fuel atomization is in an increasing condition in the step of judging.

According to the third aspect of the present invention, when it is judged that the penetration of the fuel atomization is in an increasing condition, the fuel injection timing is corrected toward an advanced side, namely, toward a higher cylinder pressure side. In other words, the fuel injection timing is corrected so that the fuel injection end timing is moved toward the peak cylinder pressure side. In this way, the generation of soot can be constrained; the adhesion of soot to the cylinder liner can be reduced; the contamination of soot into the lube-oil can be reduced; and the lubricity properties of the lube-oil can be prevented from being deteriorated. Thus, the deterioration of the performance such as fuel consumption as well as the occurrence of scuffing (seizure or scratch on cylinder liner surfaces) can be prevented.

Further, in response to the second aspect of the present invention, a fourth aspect discloses a fuel injection control method of a diesel engine, the engine including, but not limited to:

a fuel injection valve which injects fuel into a combustion chamber; and a fuel injection pressure control unit which controls a fuel injection pressure of the fuel from the fuel injection valve, wherein the method includes, but not limited to the steps of:

previously setting a standard fuel injection timing with respect to engine speed and fuel injection quantity;

subsequently judging whether or not the penetration of the fuel atomization in a cylinder is in an increasing condition, by use of at least one of a detected ambient pressure detected by an ambient pressure sensor, an estimated cylinder pressure at an injection start timing, and an estimated ignition delay from an injection start timing to a combustion start timing; and correcting the fuel injection pressure toward a reduced level and constraining the penetration of the fuel atomization, in a case where it is judged that the penetration of the fuel atomization is in an increasing condition in the step of judging.

According to the fourth aspect as described above, when it is judged that the penetration of the fuel atomization is in an increasing condition, the penetration of the fuel atomization is constrained by correcting a standard injection pressure which is established with respect to the engine speed and the fuel injection quantity toward a reduced pressure side. In this way, the adhesion of soot to the cylinder liner can be reduced; the contamination of soot into the lube-oil can be reduced; and the lubricity properties of the lube-oil can be prevented from being deteriorated. Thus, the deterioration of the performance such as fuel consumption as well as the occurrence of scuffing (seizure or scratch on cylinder liner surfaces) can be prevented.

Effects of the Invention

According to the present invention, even in a case where a fuel atomization penetration or a combustion flame penetration in a combustion chamber is extended in response to the change of an operation environment condition such as ambient pressure or ambient temperature, or even in a case where an ignition delay is prolonged, the fuel injection timing or the fuel injection pressure can be controlled so that the quantity of the soot adhesion on the cylinder liner surfaces is constrained and the quantity of the contamination of the soot in the lube-oil is constrained.

BRIEF DESCRIPTION OF THE DRAWINGS

FIG. 4(*a*) shows a configuration block diagram of a fuel injection timing correction unit according to a second mode;

FIG. 4(*b*) explains how a correction value of a fuel injection timing is computed;

FIG. 5 shows a configuration block diagram of a fuel injection timing correction unit according to a third mode;

FIG. 7 shows a configuration block diagram of a fuel injection pressure correction unit according to the fourth mode;

FIG. 8(*a*) shows a configuration block diagram of a fuel injection pressure correction unit according to a fifth mode;

FIG. 8(*b*) explains how a correction value of a common-rail pressure is computed;

FIG. 9(*a*) shows a configuration block diagram of a fuel injection pressure correction unit according to a fifth mode;

FIG. 9(*b*) explains how a correction value of a common-rail pressure is computed;

DETAILED DESCRIPTION OF THE PREFERRED MODES AND EMBODIMENTS

Hereafter, the present invention will be described in detail with reference to the modes or embodiments shown in the figures. However, the dimensions, materials, shape, the relative placement and so on of a component described in these modes or embodiments shall not be construed as limiting the scope of the invention thereto, unless especially specific mention is made.

(First Mode)

Figure 1:
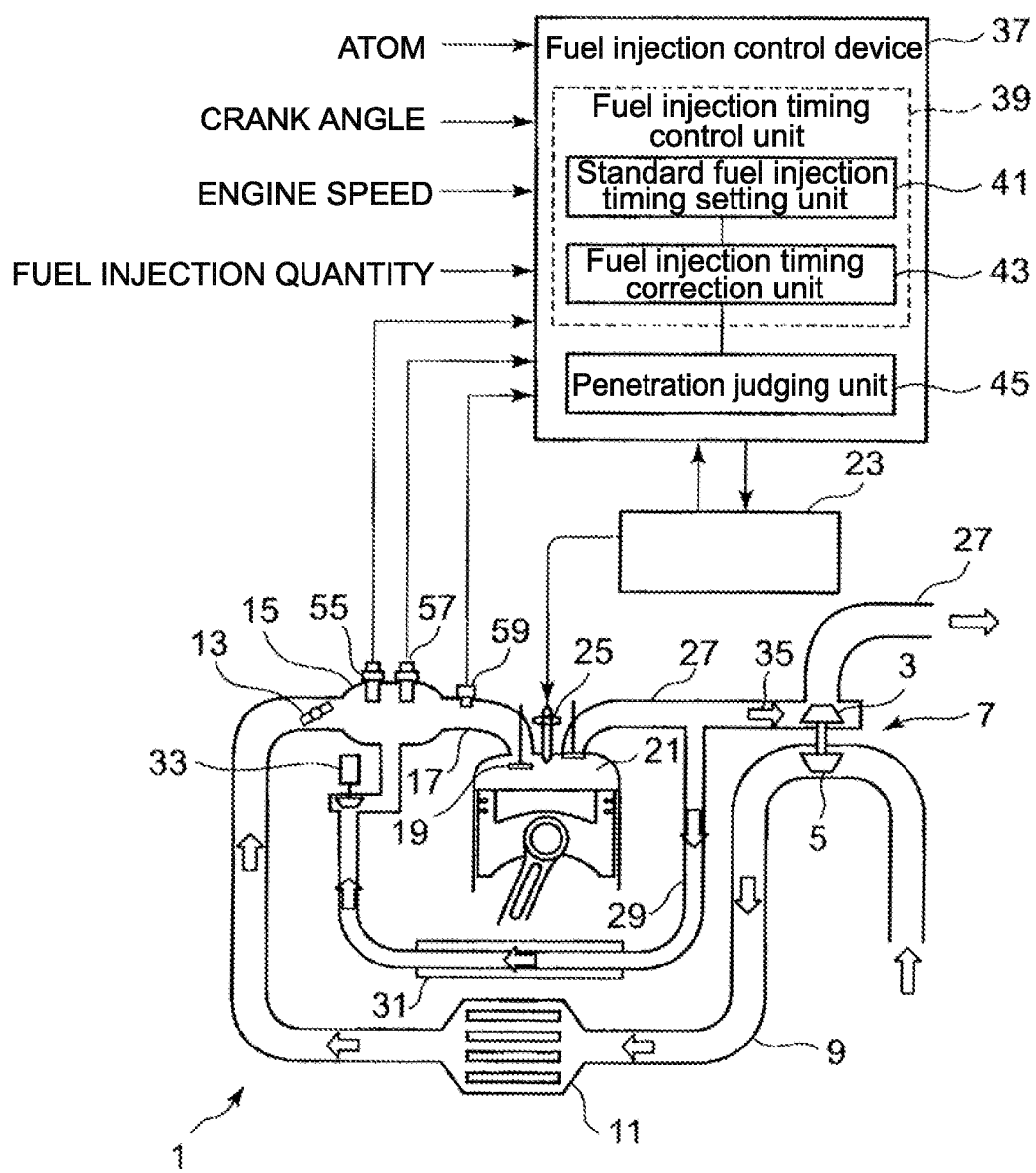
FIG. 1 shows a fuel injection control device according to a first mode of the present invention.

Based on FIG. 1, a fuel injection control device of a diesel engine according to a first mode of the present invention is now explained.

As shown in FIG. 1, the diesel engine 1 (hereafter, simply called the engine) is provided with an exhaust turbocharger 7 including, but not limited to, an exhaust turbine 3 and a compressor 5 which is driven by a rotation shaft common to the turbine and the compressor; the air delivered from the compressor 5 of the turbocharger 7 passes through an intake air passage 9, enters an intercooler 11. After the intake air is cooled in the intercooler, the flow rate of the intake air is controlled by an intake air throttle valve 13; then, the intake air streams into a combustion chamber 21 via an intake manifold 15, an air-intake port 17 provided at each cylinder and an air-intake valve 19 of the engine 1.

Further, the engine 1 is provided with a common-rail fuel injection device 23 which injects a fuel into the combustion chamber 21 while controlling the injection timing, injection quantity and injection pressure of the fuel; the common-rail fuel injection device 23 is provided with a common-rail (not shown). Toward each fuel injection valve 25 of each cylinder, the fuel whose pressure is regulated at a predetermined level is supplied at a predetermined injection-timing.

From a part way of an exhaust passage 27, an EGR (Exhaust Gas Recirculation) passage 29 diverges; a part of exhaust gas is cooled by an EGR cooler 31 so as to be charged into the intake air passage on a downstream side of the intake air throttle valve 13, via an EGR valve 33.

The combustion gas, namely, an exhaust gas 35 produced by the fuel combustion in the combustion chamber 21 of the engine 1 streams through an exhaust manifold to which each exhaust port of each cylinder is assembled; further, the exhaust gas streams through an exhaust passage 27 and streams into the exhaust turbocharger. Then, the exhaust gas drives the exhaust turbine 3, which acts as a power source for the compressor 5. Then, the exhaust gas streams into an exhaust gas process device (not shown) via an exhaust passage 27.

Further, the common-rail fuel injection device 23 controls the supply of fuel to the fuel injection valve 25 by the signal from a fuel injection control device 37. The fuel injection control device 37 is provided with a fuel injection timing control unit 39, which includes, but not limited to, a standard fuel injection timing setting unit 41 and a fuel injection timing correction unit 43. Further, the fuel injection control device 37 is provided with a penetration judging unit 45.

The standard fuel injection timing setting unit 41 memorizes the data as a fuel injection timing standard-map 47 in which the fuel injection timing with respect to the engine speed and the fuel injection quantity (the engine load) based on a standard operation environment condition (e.g. under a condition of normal atmospheric pressure and normal temperature (e.g. 20° C.)) is established. Hereby, the fuel injection timing is previously determined, for instance, by experiments.

The fuel injection timing correction unit 43 corrects the fuel injection timing so as to constrain the penetration in a case where the penetration judging unit 45 judges that the penetration of fuel atomization or combustion flame is in an increasing tendency.

Further, each of the signals of atmospheric pressure, engine crank angle, engine speed and fuel injection quantity is inputted into the fuel injection control device 37. Further, each of the signals from an intake manifold temperature sensor 55, an intake manifold pressure sensor 57 and an oxygen concentration sensor 59 which are provided at the intake manifold 15 is inputted into the fuel injection control device.

Figure 2:
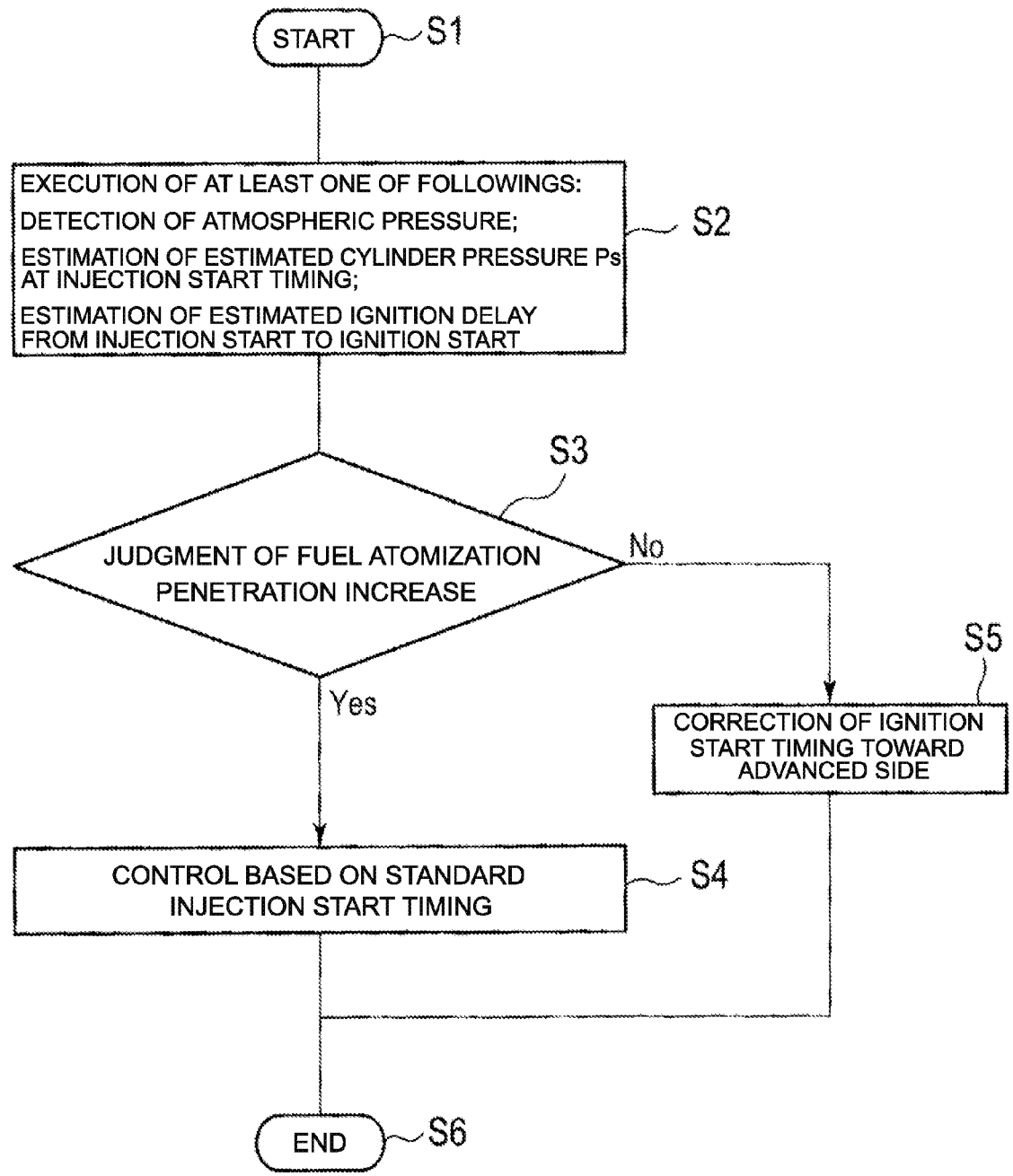
FIG. 2 shows a control flow chart of the fuel injection control device.

In the fuel injection control device 37 as configured above, the fuel injection timing control is performed as shown in FIG. 2. After the control starts at the step S1, the step S1 is followed by the step S2, where at least one of the atmospheric pressure detection by the atmospheric pressure sensor, the computation of the estimated cylinder pressure at the fuel injection start timing, and the computation of the estimated ignition delay from the fuel injection start timing to the ignition start timing is performed.

Incidentally, in the first mode of the present invention, based on the detected atmospheric pressure, it is judged whether or not the penetration of fuel atomization is increasing and the fuel injection timing is corrected. This example is firstly explained as follows.

In the step S3, based on the difference from a standard atmospheric pressure such as normal atmospheric pressure, it is judged whether or not the penetration of the fuel atomization in the cylinder is increasing. In other words, when the atmospheric pressure changes and the pressure detected by the atmospheric pressure sensor (not shown) drops below normal atmospheric pressure, the air density in the cylinder is accordingly reduced. Therefore, the penetration-judging unit 45 judges that the penetration of fuel atomization or combustion flame is in an increasing tendency.

When it is judged that the penetration is increasing based on the judgment result, the step S3 is followed by the step S4, where the fuel injection timing is corrected toward an advanced timing; when the penetration is not increasing, the step S3 is followed by the step S5, where the fuel injection is controlled based on the standard fuel injection start timing. The step S4 or the step S5 is followed by the step S6, where the control flow finishes.

Figure 10:
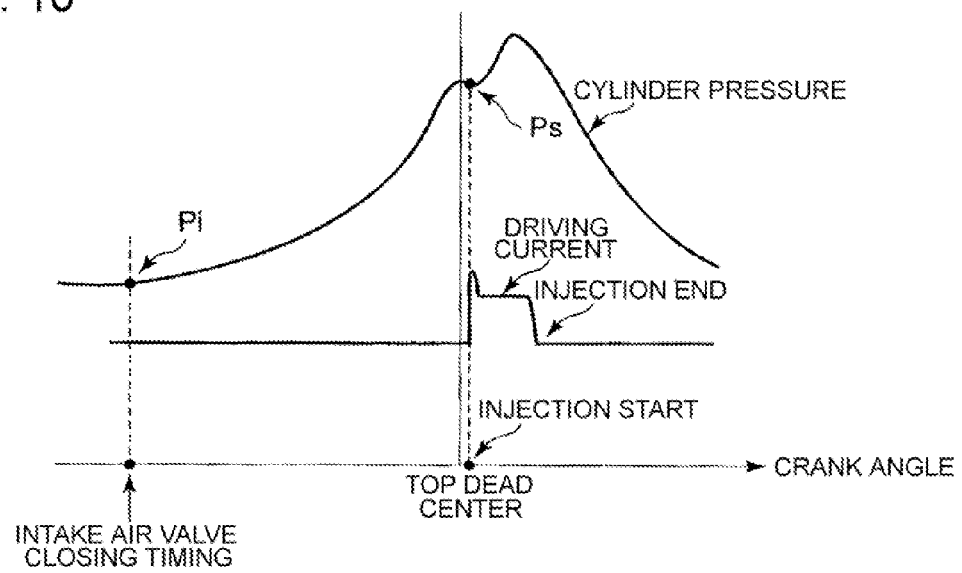
FIG. 10 explains a relationship between the change of the gas pressure in a cylinder and the change of driving current of the fuel injection valve.

The fuel injection timing is controlled by an ON-OFF timing of a driving current for a solenoid valve which controls the fuel supply from the common-rail of the common-rail fuel injection device 23 to each fuel injection valve 25. In other words, as shown in FIG. 10, an ON-timing of the driving current determines the fuel injection start timing and an OFF-timing of the driving current determines the fuel injection end timing.

Figure 11:
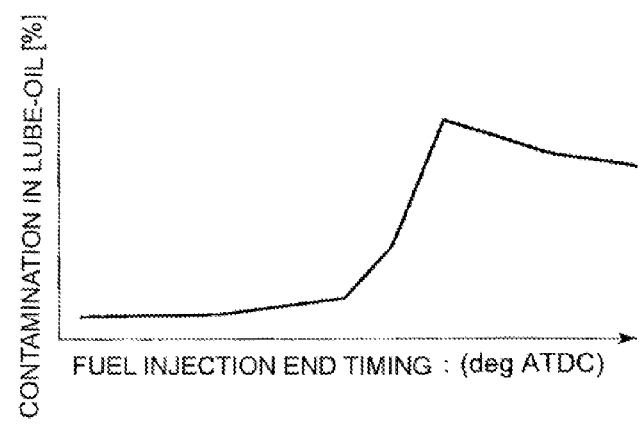
FIG. 11 explains a relationship between the contamination rate of soot in lube-oil and the timing of the fuel injection end.

As already explained by FIG. 11, when the fuel ignition end timing is excessively retarded, the fuel injection period enters and overlaps with a period in which the cylinder pressure is reduced; and, the penetration of the atomization is inclined to increase. Thus, when the timing retard reaches a certain retard crank-angle, the contamination rate of soot in lube-oil is inclined to increase abruptly. Hence, it is necessary to limit the timing so as not to retard the fuel injection end timing beyond a crank angle (for instance, 25 degrees after TOP DEAD CENTER) where the abrupt change appears.

Hence, in the standard fuel injection timing setting unit 41, the fuel injection start timing is established so that the fuel injection end timing is not retarded beyond the crank angle of 25 degrees after TOP DEAD CENTER, under a standard operation environment condition (e.g. under a condition of normal atmospheric pressure and normal temperature (e.g. 20° C.)).

However, when the atmospheric pressure changes and the pressure detected by the atmospheric pressure sensor (not shown) drops, the air density in the cylinder is reduced in response to the pressure drop and the penetration of fuel atomization increases. Thus, when it is judged that the penetration of fuel atomization is in an increasing tendency based on the atmospheric pressure, namely, when the atmospheric pressure drops, the penetration judging unit corrects the fuel injection timing so as to constrain the penetration.

Figure 3:
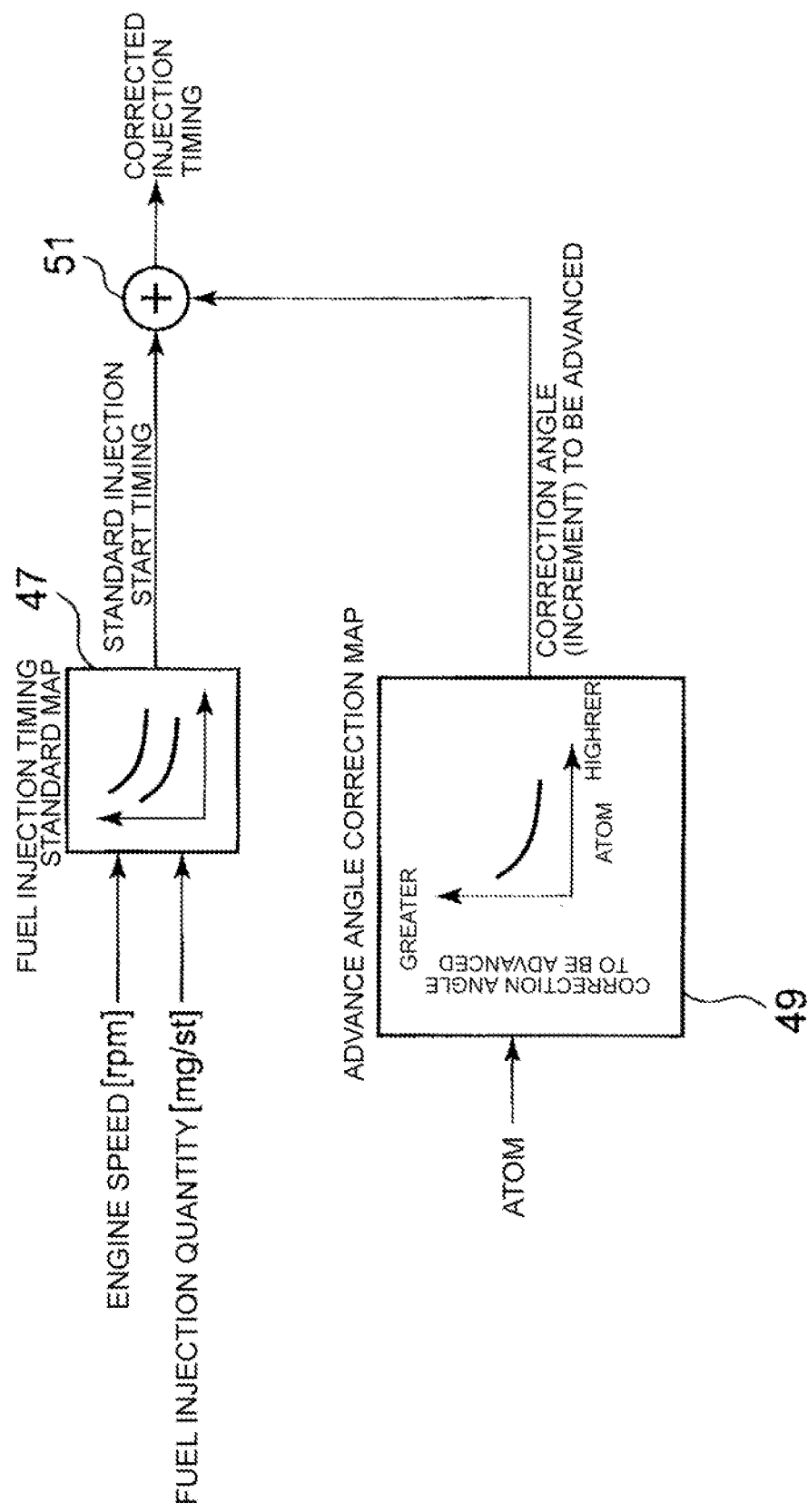
FIG. 3 shows a configuration block diagram of a fuel injection timing correction unit in the fuel injection control device.

As shown in FIG. 3, in correcting the fuel injection timing, a standard fuel injection start timing is computed by use of the fuel injection timing standard-map 47 based on the detected signals of the engine speed and the fuel injection quantity (the engine load). Further, based on the atmospheric pressure signal from the atmospheric pressure sensor, by use of a timing control correction map 49, a timing advance angle is computed. As shown in FIG. 3, in the timing control correction map 49, the timing control correction angle is established with respect to the atmospheric pressure. The timing advance angle is added to the standard fuel injection start timing by an adder 51 and the corrected fuel-injection-timing is computed.

As described above, in response to the drop of the atmospheric pressure, the fuel injection start timing is corrected toward the advance side. Thus, the fuel injection end timing is also advanced by the same angle. Accordingly, as shown in FIG. 10, the fuel injection end timing is advanced toward a position at which the cylinder pressure becomes higher (toward the peak side). Thus, the fuel injection end timing is prevented from entering a retard crank-angle area where the contamination of the soot in the lube-oil tends to abruptly increase. In this way, the contamination of the soot in the lube-oil is effectively prevented.

(Second Mode)

In the next place, based on FIGS. 2, 4(a) and 4(b), a second mode of the present invention is now explained. In the example of the first mode, whether or not the penetration of the fuel atomization or the combustion flame is in an increasing tendency is judged based on the detected atmospheric pressure; and the fuel injection timing is corrected. In the example of this second mode, whether or not the penetration of the fuel atomization or the combustion flame is in an increasing tendency is judged based on the computation result of the estimated cylinder pressure at the fuel injection start timing; and the fuel injection timing is corrected.

In the step S2 of FIG. 2, the estimated cylinder pressure Ps at the fuel injection start timing is computed by use of the following formula (1) on the basis of the adiabatic compression change in a diesel cycle.

$$Ps = Pi \times \epsilon^\kappa \quad (1)$$

where

Pi is the cylinder pressure at the intake air valve closing timing, (the pressure in the intake manifold 15 when the air-intake valve is closed), $\epsilon$ is an actual compression ratio, and $\kappa$ is a polytropic exponent.

Further, in the step S3, the judgment as to whether or not the penetration of the fuel atomization is in an increasing tendency is performed by the penetration judging unit 45. In this second mode, in this judgment regarding the penetration, the penetration judging unit 45 uses the comparison between the standard cylinder pressure P1 at the fuel injection start timing and the estimated cylinder pressure Ps computed by the formula (1). Hereby, the standard cylinder pressure P1 at the fuel injection start timing is established based on the engine speed and the fuel ignition quantity (the engine load).

In other words, in a case where the estimated cylinder pressure Ps is lower than the standard cylinder pressure, it is judged that the penetration of the fuel atomization or the combustion flame is in an increasing tendency. Based on this judgment, the fuel injection timing is corrected.

As shown in FIG. 4(a), in this correction of the fuel injection timing, the standard cylinder pressure P1 at the fuel injection start timing is computed by use of a cylinder pressure standard-map 61 with respect to the engine speed and the fuel ignition quantity (the engine load). This cylinder pressure standard-map 61 is a map in which the cylinder pressure at the fuel injection start timing is previously established by experiments or computations with respect to the engine speed and the fuel injection quantity. In addition, the estimated cylinder pressure Ps is computed at a cylinder pressure computing-section 63 by use of the formula (1); the difference (P1−Ps) between the standard cylinder pressure P1 and the estimated cylinder pressure Ps is computed at a subtractor 65. And, the fuel injection timing correction value in response to this cylinder pressure difference is computed by a fuel injection timing correction computing-section 67.

As shown in FIG. 4(b), in computing the fuel injection timing correction value by the fuel injection timing correction computing-section 67, a previously established relationship between the cylinder pressure difference (the standard cylinder pressure—the estimated cylinder pressure) and the timing advance angle is used; or, the data in the previously established map is used. When the cylinder pressure becomes lower and the difference against the standard cylinder pressure becomes positive (comes to a plus side), the penetration of the fuel atomization or the combustion flame increases. Hence, the fuel injection timing is advanced so as to reduce the adhesion of the soot. Thus, the timing advance angle for correcting the fuel injection timing is computed.

In addition, the timing advance angle for correcting the fuel injection timing is added to the standard fuel injection start timing at an adder 69 so as to compute the corrected fuel-injection-timing, as is the case with the explanation of the first mode.

As described above, according to the second mode, the estimated cylinder pressure Ps at the fuel injection start timing is computed based on the pressure in the intake manifold 15, the pressure being detected by the intake manifold pressure sensor 57 when the air-intake valve is closed; based on the computed result, whether or not the penetration of the fuel atomization or the combustion flame is in an increasing tendency is judged so that the fuel injection timing is corrected toward an advanced side. In other word, the cylinder pressure is directly estimated, and the judgment and the correction are performed. Thus, in comparison with the approach of the first mode where the judgment and the correction are performed based on the atmospheric pressure, a judgment and an injection-timing-correction with further accuracy can be achieved in the approach of this second mode.

(Third Mode)

In the next place, based on FIGS. 2 and 5, a third mode of the present invention is now explained. In the example of the first mode, whether or not the penetration of the fuel atomization is in an increasing tendency is judged based on the detected atmospheric pressure; and the fuel injection timing is corrected. In the example of this third mode, whether or not the penetration of the fuel atomization is in an increasing tendency is judged based on the estimated ignition delay which is computed as a period from the fuel ignition start timing to the ignition timing; and the fuel injection timing is corrected.

In the step S2 of FIG. 2, the estimated ignition delay τs from the fuel ignition start timing to the ignition timing is computed by use of the following formula (2). In the formula (2), the estimated ignition delay τs is expressed as a function with respect to the temperature Tim in the intake manifold 15, the pressure Pim in the intake manifold 15 and the oxygen concentration $O_2$ in the intake-air. Hereby, the temperature Tim in the intake manifold 15 is detected by the intake manifold temperature sensor 55; the pressure Pim in the intake manifold 15 is detected by the intake manifold pressure sensor 57; and, the intake-air oxygen concentration $O_2$ is detected by the oxygen concentration sensor 59.

$$\tau s = f(Tim, Pim, O_2 \text{ concentration}) \quad (2)$$

where

Tim is the temperature in the intake manifold, and Pim is the pressure in the intake manifold 15.

Further, in the step S3, the judgment as to whether or not the penetration of the fuel atomization is in an increasing tendency is performed by the penetration judging unit 45. As for this third mode, in this judgment regarding the penetration, the penetration judging unit 45 uses the comparison between the standard ignition delay τ1 and the estimated ignition delay τs computed by the formula (2). Hereby, the standard ignition delay τ1 is established based on the engine speed and the fuel ignition quantity (the engine load).

In other words, in a case where the estimated ignition delay τs is greater than the standard ignition delay τ1, the fuel injection end timing is moved toward an advanced side; hereby, it is judged that the penetration of the fuel atomization or the combustion flame is in an increasing tendency. Based on this judgment, the fuel injection timing is corrected.

As shown in FIG. 5, in this correction of the fuel injection timing, the standard ignition delay period from the fuel ignition start timing to the ignition timing is computed by use of an ignition delay estimation standard-map 71 based on the engine speed and the fuel ignition quantity (the engine load). This ignition delay estimation standard-map 71 is a map in which the standard ignition delay from the fuel ignition start timing to the ignition timing is established previously by experiments or computations with respect to the engine speed and the fuel injection quantity. In addition, the estimated ignition delay τs is computed at an ignition delay computing-section 73 by use of the formula (2); the difference (τs−τ1) between the standard ignition delay τ1 and the estimated ignition delay τs is computed at a subtractor 75. And, this ignition delay difference is directly used as the fuel injection timing correction value, namely, a timing advance correction angle.

In addition, the timing advance correction angle for correcting the fuel injection timing is added to the standard fuel injection start timing at an adder 77 so as to compute the corrected fuel-injection-timing, as is the case with the explanation of the first mode.

As described above, according to the third mode, the estimated ignition delay τs from the fuel ignition start timing to the ignition timing is computed by use of the formula in which the estimated ignition delay τs is expressed as a function with respect to the temperature Tim in the intake manifold 15, the pressure Pim in the intake manifold 15 and the oxygen concentration $O_2$ in the intake-air; based on the computed result, whether or not the penetration of the fuel atomization or the combustion flame is in an increasing tendency is judged so that the fuel injection timing is corrected toward an advanced side. Hence, the ignition delay is directly estimated, and the judgment and the correction are performed. Thus, in comparison with the approach of the first mode where the judgment and the correction are performed based on the atmospheric pressure, a judgment and an injection-timing-correction with further accuracy can be achieved in the approach of this third mode.

Further, even when the intake air temperature changes (especially, in a case of prolonged ignition delay under a low temperature environment condition) or even when the intake air oxygen concentration changes in response to the EGR control (especially, in a case of prolonged ignition delay under an extensive EGR condition), a judgment as well as an ignition timing correction with further accuracy can be achieved, in comparison with a judgment as well as an ignition timing correction in response to each condition.

(Fourth Mode)

Figure 6:
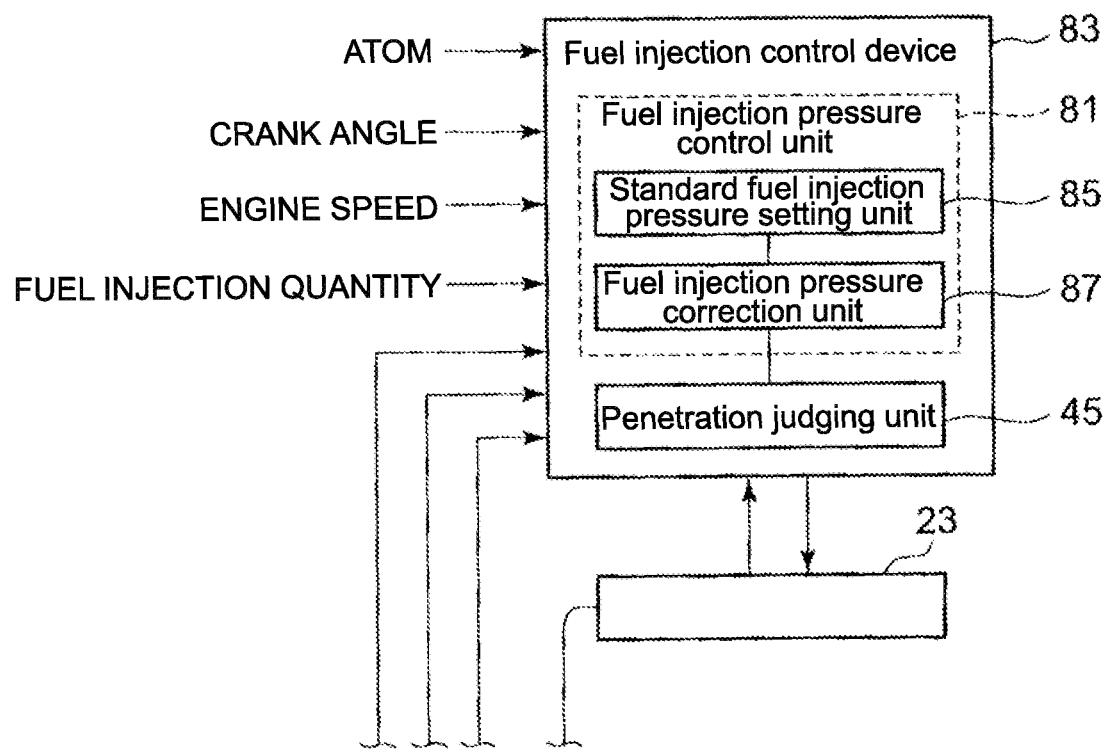
FIG. 6 shows an outline configuration of the fuel injection control device according to a fourth mode.

In the next place, based on FIGS. 6 and 7, a fourth mode of the present invention is now explained. In the first mode to the third mode, the configuration in which the fuel ignition timing is corrected by the fuel injection timing control unit 39 has been explained. In this fourth mode and the following fifth to sixth modes, a fuel injection control device 83 provided with a fuel injection pressure control unit 81 instead of the fuel injection timing control unit 39 will be explained.

In addition, the fourth mode, the fifth mode and the sixth mode correspond to the first mode, the second mode and the third mode, respectively.

The fuel injection pressure control unit 81 includes, but not limited to, a standard fuel injection pressure setting unit 85 and a fuel injection pressure correction unit 87. The fuel injection pressure control means 81 is provided with the penetration judging unit 45, as is the case with the first to third modes.

The standard fuel injection pressure setting unit 85 memorizes the data as a common-rail pressure standard-map 91 in which the fuel injection pressure with respect to the engine speed and the fuel injection quantity (the engine load) based on a standard operation environment condition (e.g. under a condition of normal atmospheric pressure and normal temperature (e.g. 20° C.)) is established. Hereby, the fuel injection pressure is previously determined, for instance, by experiments.

Further, the fuel injection pressure correction unit 87 corrects the fuel injection pressure so as to constrain the penetration in a case where the penetration judging unit 45 judges that the penetration of fuel atomization or combustion flame is in an increasing tendency.

As for the control as well as the correction of the fuel injection pressure, the fuel injection pressure from each fuel injection valve 25 is controlled and corrected by regulating the common-rail pressure (hereafter called rail pressure, too) of the common-rail fuel injection device 23.

As shown in FIG. 7, in correcting the fuel injection pressure, a standard fuel injection pressure is computed by use of the rail pressure standard-map 91 based on the detected signals of the engine speed and the fuel injection quantity (the engine load). Further, based on the atmospheric pressure signal from the atmospheric pressure sensor, by use of a common-rail pressure correction map 93, a correction rail-pressure, namely, increment value is computed. As shown in FIG. 7, in the rail pressure correction map 93, the correction rail-pressure value is established with respect to the atmospheric pressure. The correction rail-pressure value is subtracted from the standard rail-pressure by a subtractor 95 and the corrected rail-pressure is computed.

As described above, in response to the drop of the atmospheric pressure, the common-rail pressure is corrected toward a reduced pressure side. Thus, the adhesion level of the penetration of the fuel atomization or the combustion flame on the cylinder liner is constrained; and, the quantity of the contamination of the soot in the lube-oil is effectively constrained.

(Fifth Mode)

In the next place, a fifth mode of the present invention is now explained based on FIGS. 8(a) and 8(b). In this fifth mode, the fuel injection pressure is corrected in comparison with the correction based on the fuel injection timing in the second mode.

As shown in FIG. 8(a), in the correction of the fuel injection pressure, the standard cylinder pressure at the fuel injection start timing is computed by use of a cylinder pressure standard-map 61 based on the detected engine-speed-signal and the detected fuel-ignition-quantity signal. This cylinder pressure standard-map 61 is a map in which the cylinder pressure at the fuel injection start timing is previously established by experiments or computations with respect to the engine speed and the fuel injection quantity. In addition, the estimated cylinder pressure Ps is computed at a cylinder pressure computing-section 63 by use of the formula (1); the difference (P1−Ps) between the standard cylinder pressure P1 and the estimated cylinder pressure Ps is computed at a subtractor 65. And, the rail-pressure correction value in response to this cylinder pressure difference is computed by a common-rail pressure correction (value) computing-section 101.

As shown in FIG. 8(b), in computing the rail-pressure correction value by the common-rail pressure correction (value) computing-section 101, a previously established relationship between the cylinder pressure difference (the standard cylinder pressure—the estimated cylinder pressure) and the rail-pressure is used; or, the data in the previously established map is used. When the cylinder pressure becomes lower and the difference against the standard cylinder pressure becomes positive (comes to a plus side), the penetration of the fuel atomization or the combustion flame increases. Hence, the rail-pressure is reduced so as to decrease the adhesion of the soot. In order to correct the rail-pressure, the rail-pressure correction value is computed.

Thus, this rail-pressure correction value is subtracted from the standard rail-pressure which is the same as the standard rail-pressure explained in the fourth mode, by a subtractor 103. And, the corrected rail-pressure is computed.

As described above, according to the fifth mode, the estimated cylinder pressure at the fuel injection start timing is computed on the basis of the pressure inside of the intake manifold 15 at the timing when the air-intake valve closes; based on the computed result, whether or not the penetration of the fuel atomization or the combustion flame is in an increasing tendency is judged so that the fuel ignition pressure is corrected toward a reduced side. Thus, in comparison with the approach of the fourth mode where the judgment and the correction are performed based on the atmospheric pressure, a judgment and a fuel injection pressure correction can be achieved with further accuracy in the approach of this fifth mode.

Further, by correcting the common-rail pressure toward a reduced pressure side when the penetration of the fuel atomization or combustion flame is in an increasing tendency, the adhesion level of the penetration of the fuel atomization or the combustion flame on the cylinder liner is constrained; and, the quantity of the contamination of the soot in the lube-oil is effectively constrained.

(Sixth Mode)

In the next place, on the basis of FIGS. 9(a) and 9(b), a sixth mode of the present invention is now explained. In this sixth mode, the fuel injection pressure is corrected in comparison with the correction based on the fuel injection timing in the third mode.

As shown in FIG. 9(a), in the correction of the fuel injection pressure, the standard ignition delay period from the fuel ignition start timing to the ignition timing is computed by use of the ignition delay estimation standard-map 71 based on the engine speed and the fuel ignition quantity. This ignition delay estimation standard-map 71 is a map in which the standard ignition delay from the fuel ignition start timing to the ignition timing is previously established by experiments or computations with respect to the engine speed and the fuel injection quantity. In addition, the estimated ignition delay $\tau s$ is computed at an ignition delay computing-section 73 by use of the formula (2); the difference ($\tau s-\tau 1$) between the standard ignition delay $\tau 1$ and the estimated ignition delay $\tau s$ is computed at the subtractor 75. And, the fuel injection pressure correction value (increment) in response to this ignition delay difference is computed by a rail-pressure correction computing section 105.

As shown in FIG. 9(b), in computing the rail-pressure correction value by the rail-pressure correction computing section 105, a previously established relationship between the ignition delay difference (the standard ignition delay—the estimated ignition delay) and the rail-pressure is used; or, the data in the previously established map is used. When the ignition delay is prolonged and the difference against the standard ignition delay becomes positive (comes to a plus side), the penetration of the fuel atomization or the combustion flame increases.

Thus, this rail-pressure correction value is subtracted from the standard rail-pressure which is the same as the standard rail-pressure explained in the fourth mode, by a subtractor 107. And, the corrected rail-pressure is computed.

As described above, according to the sixth mode, the estimated ignition delay $\tau s$ from the fuel ignition start timing to the ignition timing is computed by use of the formula in which the estimated ignition delay $\tau s$ is expressed as a function with respect to the temperature Tim in the intake manifold 15, the pressure Pim in the intake manifold 15 and the oxygen concentration $O_2$ in the intake-air; based on the computed result, whether or not the penetration of the fuel atomization or the combustion flame is in an increasing tendency is judged so that the fuel injection pressure is reduced toward a reduced pressure side. In other word, the ignition delay is directly estimated, and the judgment and the correction are performed. Thus, in comparison with the approach of the fourth mode where the judgment and the correction are performed based on the atmospheric pressure, a judgment and a fuel injection pressure correction with further accuracy can be achieved in the approach of this sixth mode.

Further, even when the intake air temperature changes (especially, in a case of prolonged ignition delay under a low temperature environment condition) or even when the intake air oxygen concentration changes in response to the EGR control (especially, in a case of prolonged ignition delay under an extensive EGR condition), a judgment as well as an ignition timing correction with further accuracy can be achieved, in comparison with a judgment as well as an ignition timing correction in response to each condition.

Further, by controlling the common-rail pressure toward a reduced pressure side when the penetration of the fuel atomization or the combustion flame is in an increasing tendency, the adhesion level of the penetration of the fuel atomization or the combustion flame on the cylinder liner is constrained; and, the quantity of the contamination of the soot in the lube-oil is effectively constrained.

In the first to sixth mode, it has been explained that at least one parameter out of a detected ambient pressure from an ambient pressure sensor, an estimated cylinder pressure at an injection start timing, and an estimated ignition delay from an injection start timing to a combustion start timing is used for the penetration judging unit 45. A further accurate penetration judgment and penetration correction can be achieved by combining the parameters.

Further, it goes without saying that the control of the fuel injection timing toward an advanced side and the control of the fuel injection pressure toward a reduced side may be combined.

INDUSTRIAL APPLICABILITY

According to the present invention, even in a case where a fuel atomization penetration or a combustion flame penetration in a combustion chamber is extended in response to the change of an operation environment condition such as ambient pressure or ambient temperature, or even in a case where an ignition delay is prolonged, the fuel injection timing or the fuel injection pressure can be controlled so that the quantity of the soot adhesion on the cylinder liner surfaces is constrained and the quantity of the contamination of the soot in the lube-oil is constrained. Hence, the present invention is suitably applied to a fuel injection control device as well as a fuel injection control method of a diesel engine.

The invention claimed is:

1. A fuel injection control device of a diesel engine including a fuel injection valve which injects a fuel into a combustion chamber and a fuel injection timing control unit which controls a fuel injection timing of the fuel from the fuel injection valve, the fuel injection control device comprising:
   a standard fuel injection timing setting unit which previously sets a standard fuel injection timing with respect to engine speed and fuel injection quantity;
   a penetration judging unit which judges whether or not fuel spray penetration in a cylinder is in an increasing condition, by using an estimated cylinder pressure at an injection start timing; and
   a fuel injection timing correction unit which, by correcting the standard fuel injection timing toward an advanced timing angle, constrains the fuel spray penetration when the penetration judging unit judges that the fuel spray penetration is in an increasing condition,
   wherein the estimated cylinder pressure at the injection start timing is computed based on pressure in an intake manifold, and
   wherein the penetration judging unit judges that the fuel spray penetration in the cylinder is in an increasing condition when the estimated cylinder pressure is lower than a standard cylinder pressure at the injection start timing according to the standard fuel injection timing.

2. A fuel injection control device of a diesel engine including a fuel injection valve which injects fuel into a combustion chamber and a fuel injection pressure control unit which controls a fuel injection pressure of the fuel from the fuel injection valve, the fuel injection control device comprising:
   a standard fuel injection timing setting unit which previously sets a standard fuel injection timing with respect to engine speed and fuel injection quantity;
   a penetration judging unit which judges whether or not fuel spray penetration in a cylinder is in an increasing condition, by using an estimated ignition delay from an injection start timing to a combustion start timing; and
   a fuel injection timing correction unit which, by correcting the standard fuel injection timing toward an advanced timing angle, constrains the fuel spray penetration when the penetration judging unit judges that the fuel spray penetration is in an increasing condition,
   wherein the estimated ignition delay from the injection start timing is computed based on pressure and temperature inside of an intake manifold, and oxygen concentration of inhaled gas, and
   wherein the penetration judging unit judges that the fuel spray penetration in the cylinder is in an increasing condition when the estimated ignition delay is greater than a standard ignition delay at the injection start timing according to the standard fuel injection timing.

3. A fuel injection control device of a diesel engine including a fuel injection valve which injects fuel into a combustion chamber and a fuel injection pressure control unit which controls a fuel injection pressure of the fuel from the fuel injection valve, the fuel injection control device comprising:
   a standard fuel injection pressure setting unit which previously sets standard fuel injection pressure with respect to engine speed and fuel injection quantity;
   a penetration judging unit which judges whether or not fuel spray penetration in a cylinder is in an increasing condition, by using an estimated cylinder pressure at an injection start timing; and
   a fuel injection pressure correction unit which, by correcting the fuel injection pressure toward a reduced side, constrains the fuel spray penetration when the penetration judging unit judges that the fuel spray penetration is in an increasing condition,
   wherein the estimated cylinder pressure at the injection start timing is computed based on pressure in an intake manifold, and
   wherein the penetration judging unit judges that the fuel spray penetration in the cylinder is in an increasing condition when the estimated cylinder pressure is lower than a standard cylinder pressure at the injection start timing according to a standard fuel injection timing.

4. A fuel injection control device of a diesel engine including a fuel injection valve which injects fuel into a combustion chamber and a fuel injection pressure control unit which controls a fuel injection pressure of the fuel from the fuel injection valve, the fuel injection control device comprising:
   a standard fuel injection pressure setting unit which previously sets standard fuel injection pressure with respect to engine speed and fuel injection quantity;
   a penetration judging unit which judges whether or not fuel spray penetration in a cylinder is in an increasing condition, by using an estimated ignition delay from an injection start timing to a combustion start timing; and
   a fuel injection pressure correction unit which, by correcting the standard fuel injection pressure toward a reduced side, constrains the fuel spray penetration when the penetration judging unit judges that the fuel spray penetration is in an increasing condition, and
   wherein the estimated ignition delay from the injection start timing is computed based on pressure and temperature inside of an intake manifold, and oxygen concentration of inhaled gas, and
   wherein the penetration judging unit judges that the fuel spray penetration in the cylinder is in an increasing condition when the estimated ignition delay is greater than a standard ignition delay at the injection start timing according to a standard fuel injection timing.

5. A fuel injection control method of a diesel engine which includes a fuel injection valve which injects fuel into a combustion chamber, and a fuel injection timing control unit which controls a fuel injection timing of the fuel from the fuel injection valve, the method comprising:
- previously setting a standard fuel injection timing with respect to engine speed and fuel injection quantity;
- computing an estimated cylinder pressure at an injection start timing based on pressure in an intake manifold;
- subsequently judging whether or not the fuel spray penetration in a cylinder is in an increasing condition, by using the estimated cylinder pressure at the injection start timing; and
- correcting the standard fuel injection timing toward an advanced timing angle and constraining the fuel spray penetration, when it is judged that the fuel spray penetration is in an increasing condition in said judging operation, and
- wherein, in said judging operation, the fuel spray penetration in the cylinder is judged to be in an increasing condition when the estimated cylinder-pressure is lower than a standard cylinder pressure at the injection start timing according to the standard fuel injection timing.

6. A fuel injection control method of a diesel engine which includes a fuel injection valve which injects fuel into a combustion chamber, and a fuel injection pressure control unit which controls a fuel injection pressure of the fuel from the fuel injection valve, the method comprising:
- previously setting a standard fuel injection timing with respect to engine speed and fuel injection quantity;
- computing an estimated ignition delay from an injection start timing based on pressure and temperature inside of an intake manifold and oxygen concentration of inhaled gas;
- subsequently judging whether or not fuel spray penetration in a cylinder is in an increasing condition, by using the estimated ignition delay from the injection start timing; and
- correcting the standard fuel injection timing toward an advanced timing angle and constraining the fuel spray penetration, when it is judged that the fuel spray penetration is in an increasing condition in said judging operation, and
- wherein, in said judging operation, the fuel spray penetration in the cylinder is judged to be in an increasing condition when the estimated ignition delay is greater than a standard ignition delay at the injection start timing according to the standard injection timing.

7. A fuel injection control method of a diesel engine which includes a fuel injection valve which injects fuel into a combustion chamber, and a fuel injection timing control unit which controls a fuel injection timing of the fuel from the fuel injection valve, the method comprising:
- previously setting a standard fuel injection pressure with respect to engine speed and fuel injection quantity;
- computing an estimated cylinder pressure at an injection start timing based on pressure in an intake manifold;
- subsequently judging whether or not fuel spray penetration in a cylinder is in an increasing condition, by using the estimated cylinder pressure at the injection start timing; and
- correcting the standard fuel injection pressure toward a reduced side and constraining the fuel spray penetration, when it is judged that the fuel spray penetration is in an increasing condition in said judging operation,
- wherein, in said judging operation, the fuel spray penetration in the cylinder is judged to be in an increasing condition when the estimated cylinder pressure is lower than a standard cylinder pressure at an injection start timing according to the standard injection timing.

8. A fuel injection control method of a diesel engine which includes a fuel injection valve which injects fuel into a combustion chamber, and a fuel injection timing control unit which controls a fuel injection timing of the fuel from the fuel injection valve, the method comprising:
- previously setting a standard fuel injection pressure with respect to engine speed and fuel injection quantity;
- computing an estimated ignition delay from an injection start timing based on pressure and temperature inside of an intake manifold and oxygen concentration of inhaled gas;
- subsequently judging whether or not fuel spray penetration in a cylinder is in an increasing condition, by using the estimated ignition delay from the injection start timing; and
- correcting the standard fuel injection pressure toward a reduced side and constraining the fuel spray penetration, when it is judged that the fuel spray penetration is in an increasing condition in said judging operation,
- wherein, in said judging operation, the fuel spray penetration in the cylinder is judged to be in an increasing condition when the computed estimated ignition delay is greater than a standard ignition delay at the injection start timing according to a standard fuel injection timing.

* * * * *